US011879619B2

(12) United States Patent
Kennedy

(10) Patent No.: US 11,879,619 B2
(45) Date of Patent: Jan. 23, 2024

(54) LIGHT STAKE

(71) Applicant: Canny Systems, LLC, Mansfield, TX (US)

(72) Inventor: Stacy L. Kennedy, Mansfield, TX (US)

(73) Assignee: Canny Systems, LLC, Mansfield, TX (US)

( * ) Notice: Subject to any disclaimer, the term of this patent is extended or adjusted under 35 U.S.C. 154(b) by 72 days.

(21) Appl. No.: 17/456,660

(22) Filed: Nov. 29, 2021

(65) Prior Publication Data

US 2023/0167969 A1 Jun. 1, 2023

(51) Int. Cl.
*F21V 21/08* (2006.01)
*F21V 21/088* (2006.01)

(52) U.S. Cl.
CPC ........ *F21V 21/0824* (2013.01); *F21V 21/088* (2013.01)

(58) Field of Classification Search
CPC ...... F21V 21/0824; F21V 21/088; A45F 3/44; E04H 12/2215; E04H 12/22; E04H 12/2269; E04H 15/62; F16M 11/041
USPC ... 248/309.1, 316.7, 507–508, 530, 156, 87; 362/396
See application file for complete search history.

(56) References Cited

U.S. PATENT DOCUMENTS 1,178,558 A * 4/1916 Turner ................... A01K 97/10 248/302
3,189,310 A * 6/1965 Trueson .................... F21S 8/00 248/314
4,901,960 A * 2/1990 Gary ......................... F21S 4/10 248/316.1
5,036,447 A * 7/1991 Taylor ....................... F21S 2/00 362/249.11
5,158,231 A * 10/1992 Christen ................ A01G 25/00 239/522
5,280,417 A * 1/1994 Hall .................... F21V 21/0824 362/640
5,437,449 A * 8/1995 Zink ...................... A63B 55/10 473/286
5,481,444 A * 1/1996 Schultz ..................... F21S 4/10 439/453
5,562,269 A * 10/1996 Protz, Jr. ................... F21S 4/10 248/205.5

(Continued)

OTHER PUBLICATIONS

Canny Systems, LLC, Light Stake as advertised on Jul. 10, 2018 (1 page).

*Primary Examiner* — Ingrid M Weinhold
(74) *Attorney, Agent, or Firm* — Ice Miller LLP; Justin D. Swindells

(57) ABSTRACT

A light stake for holding a light bulb includes a spike with a body extending along a spike axis between a top end and an insertion end, a connecting base at the top end of the body, and a socket having a socket axis. The socket has a socket base, a plurality of fingers, and a strengthening fillet. The socket base is perpendicular to the socket axis and with a solid-material periphery extending on all sides of the socket axis. The fingers extend from the socket base along the socket axis, with each finger extending between a fixed end near the socket base and a movable end. The strengthening fillet is at the intersection between the fixed end of each finger and the socket base, and increases the local thickness of each fixed end and of the socket base for increased rigidity of the fixed end.

20 Claims, 14 Drawing Sheets

(56) References Cited

U.S. PATENT DOCUMENTS 5,570,952 A * 11/1996 Protz, Jr. ............... F21V 21/116 248/74.1
D377,844 S * 2/1997 Gary .................................. D8/1
5,647,660 A * 7/1997 Lee ..................... F21V 21/0824 362/153.1
5,667,174 A * 9/1997 Adams ...................... A45F 3/44 248/156
5,788,361 A * 8/1998 Lee ......................... F21V 21/08 362/249.16
5,788,362 A * 8/1998 Chou ........................ F21S 4/10 362/249.14
6,059,425 A * 5/2000 Wang ........................ F21S 4/10 362/396
6,116,760 A * 9/2000 Cox .................... F21V 21/0824 362/396
6,135,623 A * 10/2000 Lin ......................... F21V 17/14 362/431
6,439,744 B1 * 8/2002 Chanslor ................... F21S 4/10 248/530
6,461,018 B1 * 10/2002 Chanslor ................. F21S 6/001 362/431
D469,566 S * 1/2003 Gary ................... F21V 21/0824 D8/1
D682,054 S * 5/2013 Gary .................................. D8/1
8,491,168 B2 * 7/2013 Cooper ................... F16B 2/245 362/396
9,644,821 B2 * 5/2017 Zhang ..................... F21V 21/08
D825,291 S * 8/2018 McDaniel .......................... D8/1
10,168,010 B1 * 1/2019 Hsu ......................... F21S 6/005
2004/0148878 A1 * 8/2004 Somerville ............ A01G 17/14 52/165
2005/0099802 A1 * 5/2005 Lai .......................... F21V 21/30 362/153
2017/0001213 A1 * 1/2017 Peterson ............... B05B 15/622

* cited by examiner

LIGHT STAKE

FIELD OF THE INVENTION

The present invention relates generally to a light stake, and, more specifically, to a stake for holding lights of decorative light strings.

BACKGROUND OF THE INVENTION

Typically, home owners and businesses enjoy arranging decorative lights during special seasons (such as Christmas) outdoors, creating light patterns in yards, gardens, or other home outdoor areas. For example, some home owners create a light outline that delineates their front property, providing joy and entertainment to visitors and others passing by. However, installing the lights of decorative light strings is a potentially cumbersome and tedious aspect in achieving a straight and/or secure light arrangement. Further accounting for a great likelihood of unfavorable weather, installing the light decorations can be a frustrating process when lights of a string are not properly supported. Furthermore, the process can be further frustrating when attempting to orient the lights of a string in a uniform manner, e.g., have all the lights in a straight, perpendicular orientation relative to the ground. From home owners, to businesses, to governmental entities, the time required in the decorating process is a huge yearly investment.

Thus, there is a need for a device and method that will improve the above-stated and other problems, including, for example, holding lights in a straight and secure manner.

SUMMARY OF THE INVENTION

According to one aspect of the present disclosure, a light stake is directed to holding a light bulb. The light stake includes a spike having a body extending along a spike axis between a top end and an insertion end, a connecting base at the top end of the body, and a socket having a socket axis. The socket has a socket base extending generally perpendicular to the socket axis and having a solid-material periphery. The solid-material periphery extends on all sides of the socket axis for increased base strength in supporting insertion or removal of the light bulb. The socket further has a plurality of fingers extending from the socket base along the socket axis. Each finger of the plurality of fingers extends between a fixed end near the socket base and a movable end. The socket also has a strengthening fillet at the intersection between the fixed end of each finger and the socket base. The strengthening fillet increases the local thickness of each fixed end and of the socket base for increased rigidity of the fixed end.

According to another aspect of the present disclosure, a light stake is directed to holding a light bulb. The light stake includes a spike having a body extending along a spike axis between a top end and an insertion end, a connecting base extending generally perpendicular to the spike axis, and a socket having a socket axis that is generally parallel to and offset from the spike axis. The socket has a socket base extending generally perpendicular to the socket axis and having a solid-material periphery. The solid-material periphery extends on all sides of the socket axis for increased base strength in supporting insertion or removal of the light bulb. The socket further has three fingers extending from the socket base along the socket axis. Each finger of the three fingers extends between a fixed end near the socket base and a movable end. The movable end of each finger is independently flexible from the other two movable ends to facilitate insertion or removal of a light bulb in the socket. The socket further has a riser that extends between the connecting base and the socket base along and offset from the socket axis. The socket further has a strengthening fillet at the intersection between the fixed end of each finger and the socket base. The strengthening fillet increases the local thickness of each fixed end and of the socket base for increased rigidity of the fixed end.

Additional aspects of the disclosure will be apparent to those of ordinary skill in the art in view of the detailed description of various embodiments, which is made with reference to the drawings, a brief description of which is provided below.

Figure 1:
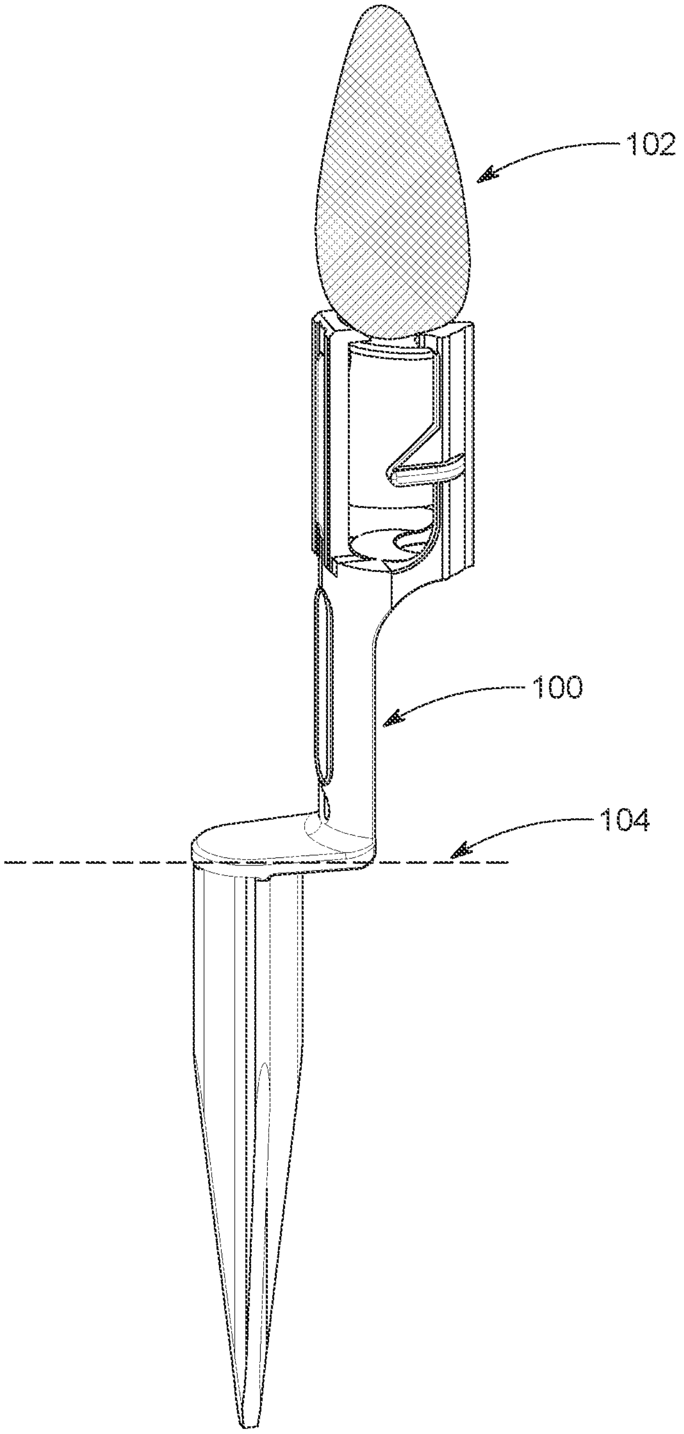
FIG. 1 is a perspective view of a light stake with a light bulb, according to one embodiment.
Figure 3:
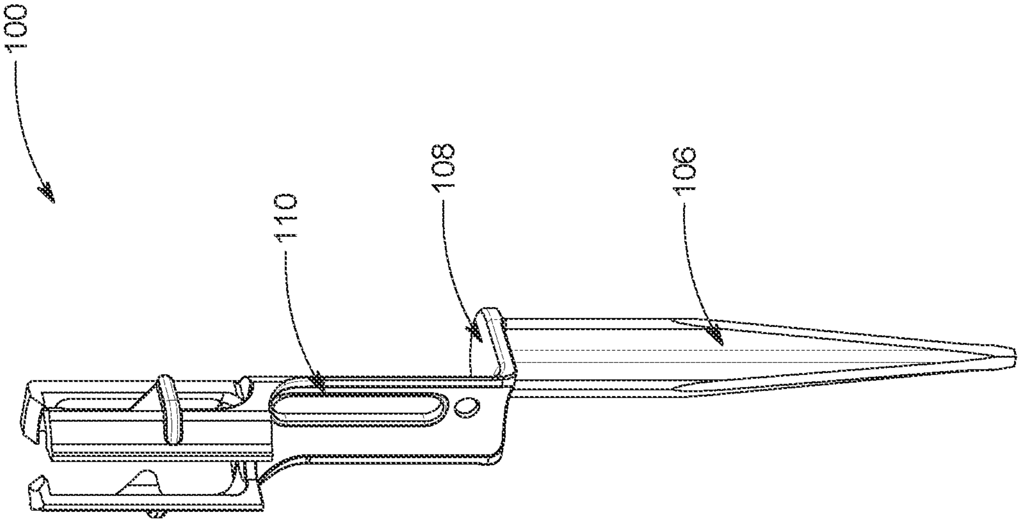
FIG. 3 is a back perspective view of the light stake of FIG. 1.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Referring to FIG. 1, a light stake 100 is directed to holding a light bulb 102, which is, for example, part of a series of light bulbs along a Christmas light-string. The light stake 100 is inserted into a ground surface 104 to hold the light bulb 102 straight and secure, forming a desired lighting pattern with adjacent ones of the light bulbs (each light bulb being inserted into a respective light stake or other holding devices).

Figure 2:
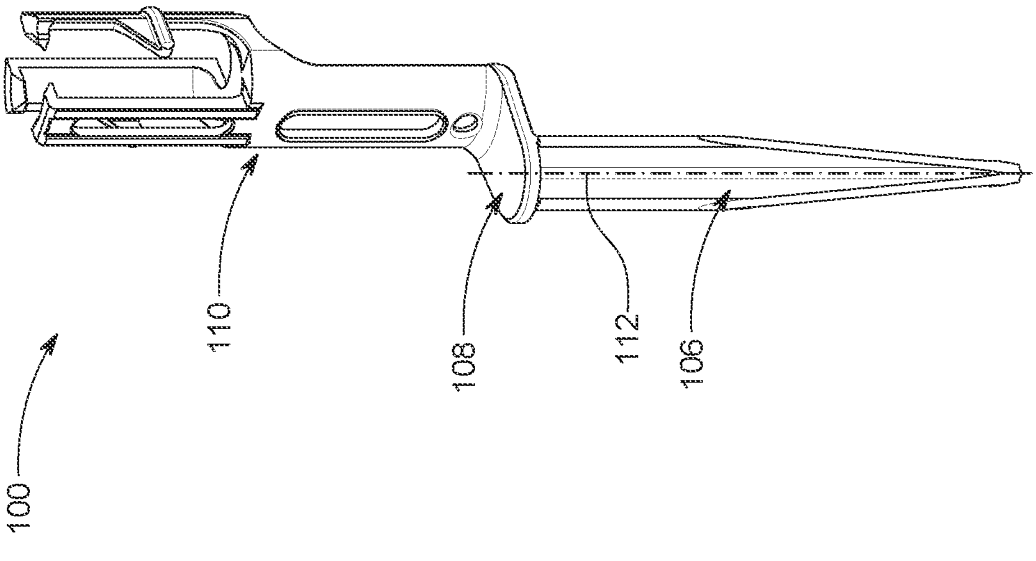
FIG. 2 is a front perspective view of the light stake of FIG. 1.
Figure 4:
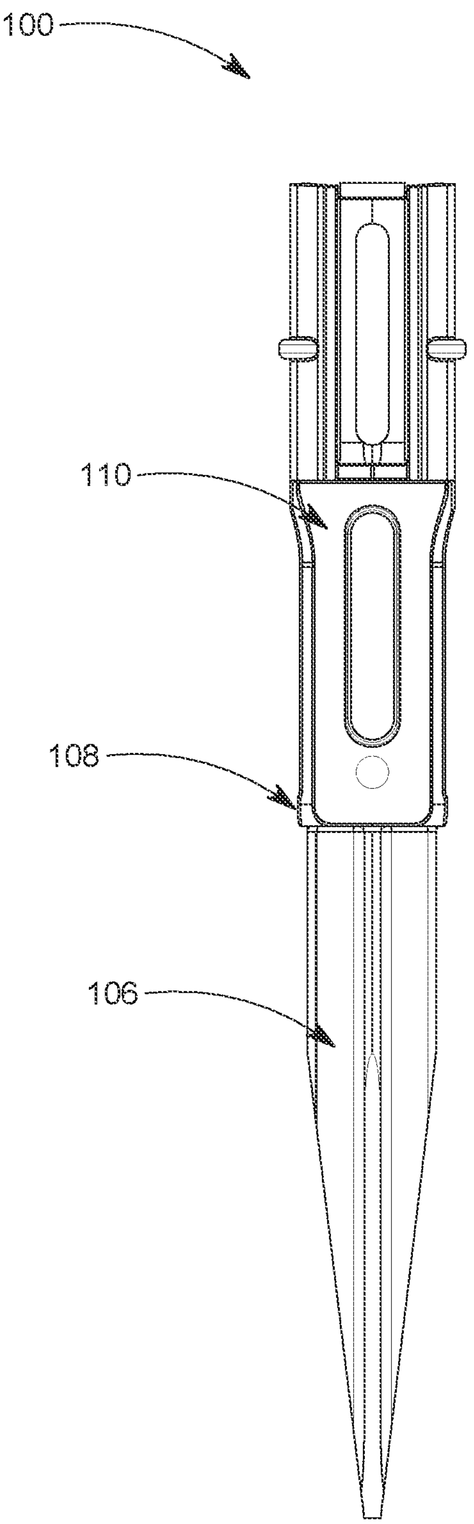
FIG. 4 is a back side view of the light stake of FIG. 1.
Figure 5:
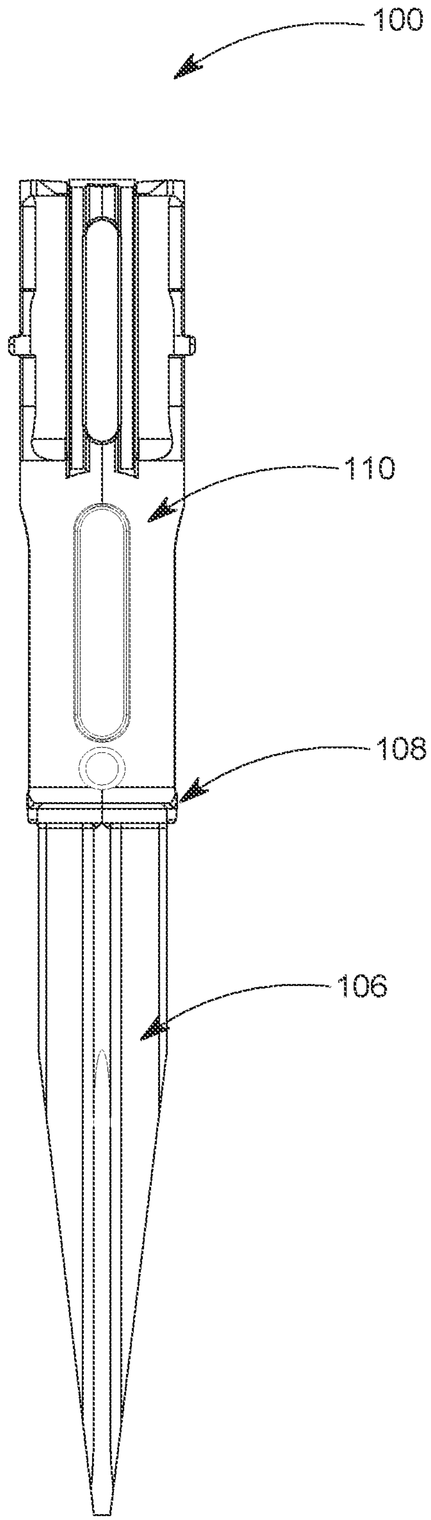
FIG. 5 is a front side view of the light stake of FIG. 1.
Figure 6:
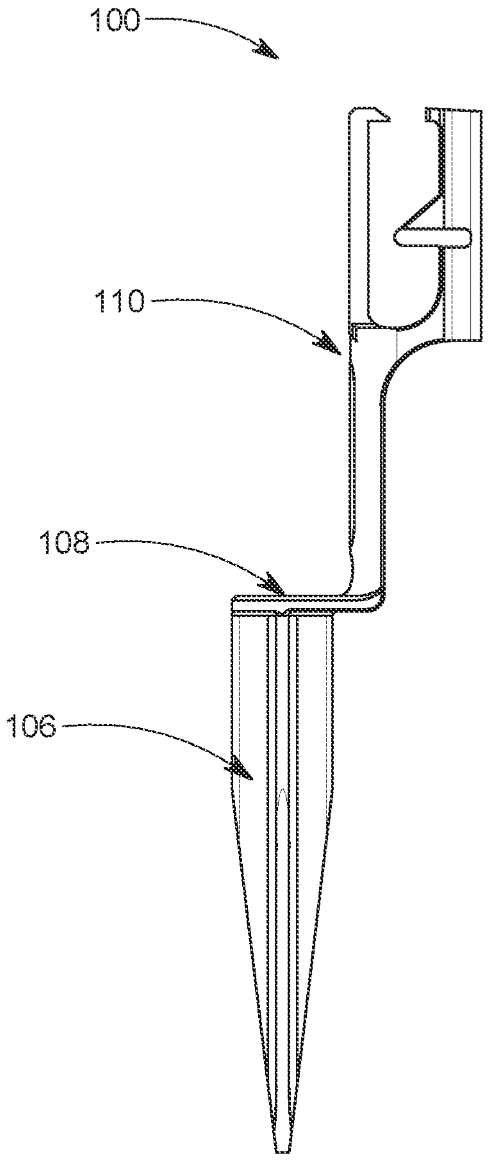
FIG. 6 is a right side view of the light stake of FIG. 1.
Figure 7:
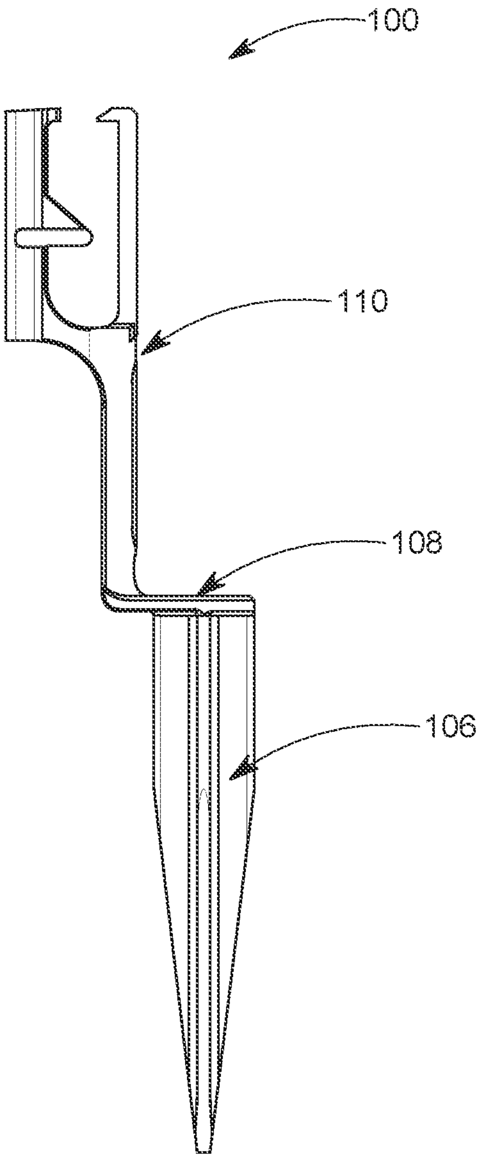
FIG. 7 is a left side view of the light stake of FIG. 1.

Referring generally to FIGS. 2-7, the light stake 100 has a spike 106, a connecting base 108, and a socket 110. The connecting base 108 is an intermediate, connecting element between the spike 106 and the socket 110. Referring specifically to FIG. 2, the connecting base 108 extends generally perpendicular to a spike axis 112. One or more features of the light stake 100 are made from a partially flexible material, such as plastic, to provide sufficient rigidity to hold a light bulb secure in place, but simultaneously allow sufficient flexibility to insert or remove the light bulb.

Figure 8:
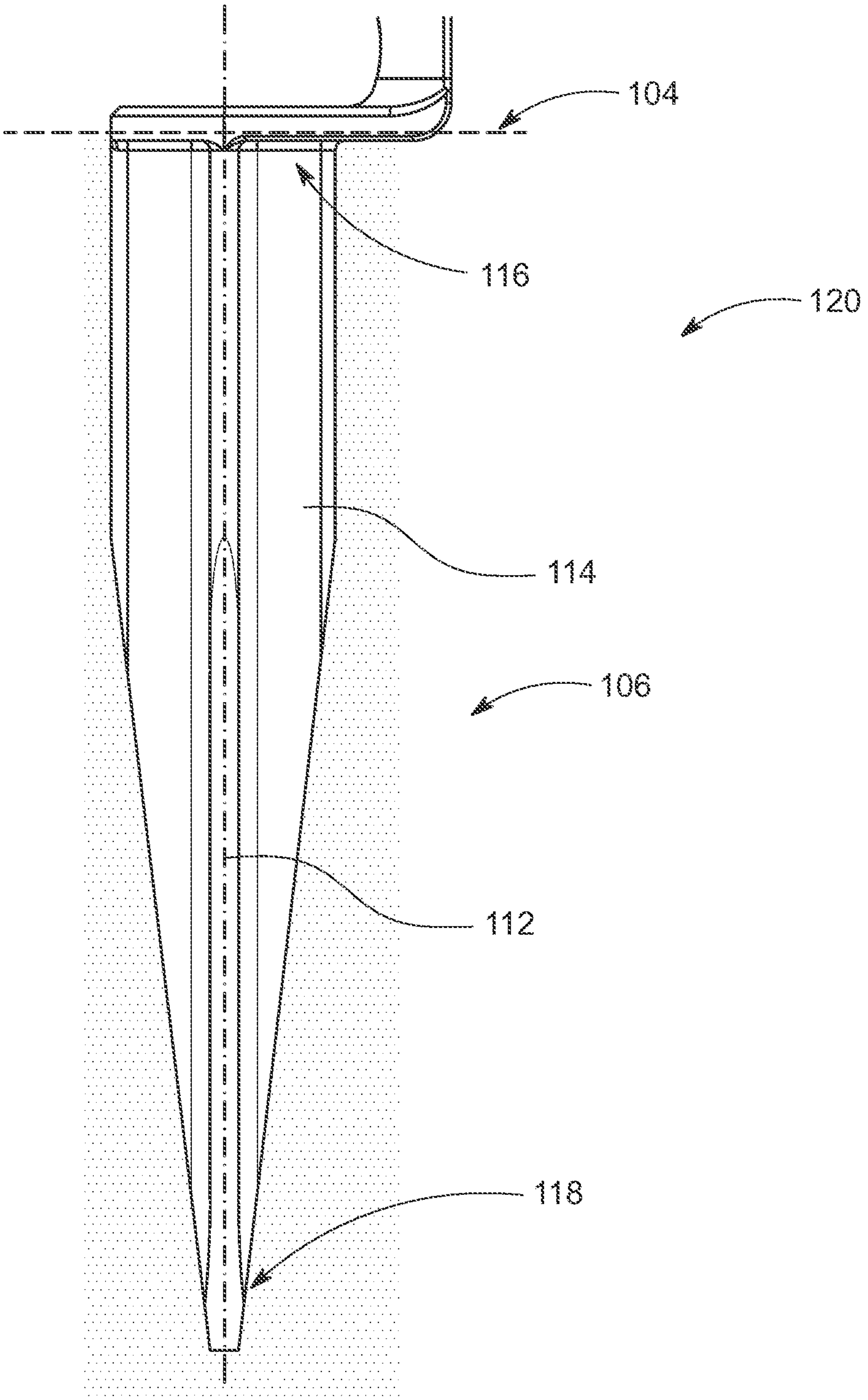
FIG. 8 is a partial right side view of the light stake of FIG. 1, illustrating a spike in accordance with an exemplary embodiment.

Referring to FIG. 8, the spike 106 has a body 114 that extends along the spike axis 112. The body extends between a top end 116 and an insertion end 118. The insertion end 118 is inserted through the ground surface 104 for securing the spike 106 into the ground 120. After full or partial insertion of the insertion end 118 into the ground 120, the spike 106 is fully or partially immersed into the ground 120. Optionally, the insertion end 118 of the spike 106 is narrower than the top end 116 for facilitating driving the spike 106 through the ground surface 104.

Figure 9:
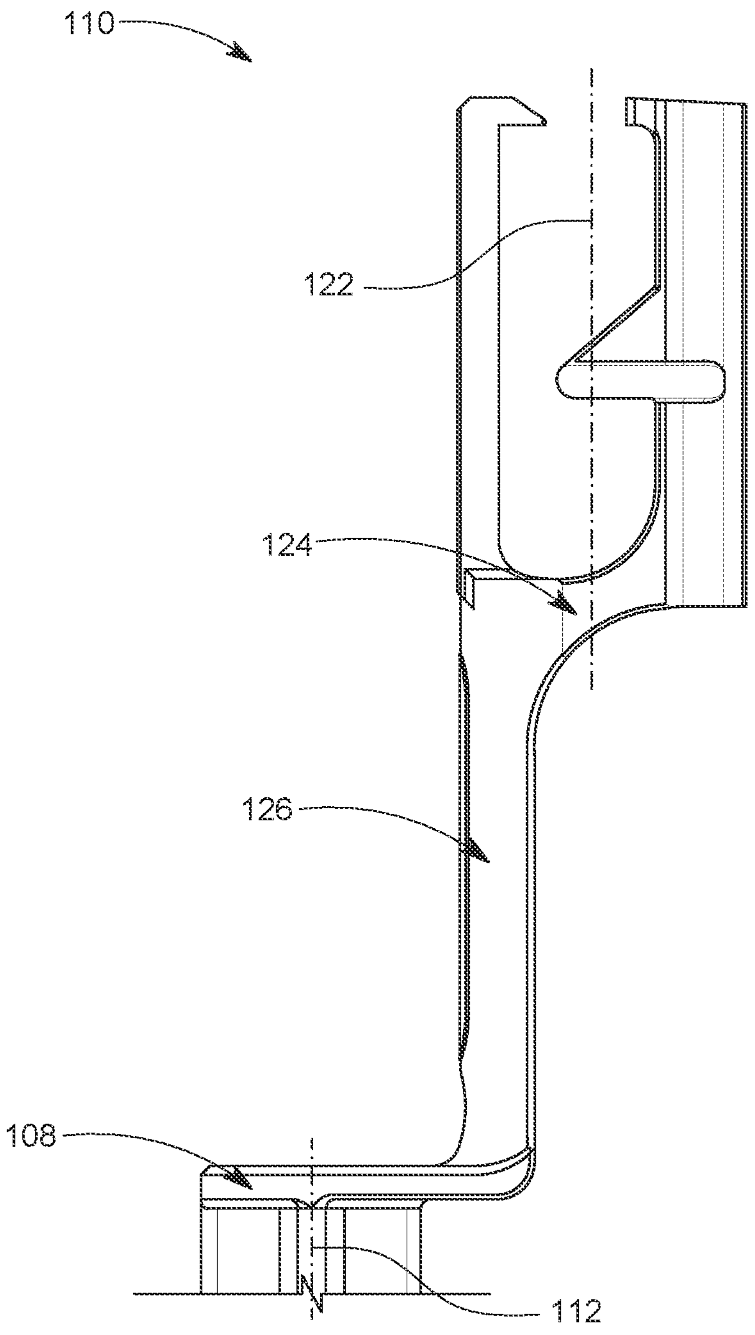
FIG. 9 is a partial right side view of the light stake of FIG. 1, illustrating a socket in accordance with another exemplary embodiment.

Referring to FIG. 9, the socket 110 has a socket axis 122 that is generally parallel to and offset from the spike axis 112. The socket 110 includes a socket base 124 that is generally perpendicular to the socket axis 122, and a riser 126 that extends between the connecting base 108 and the socket base 124. The riser 126 is offset from the socket axis 122 and from the spike axis 112.

One benefit of having an offset between the connecting base 108 and riser 126 is that the offset provides the connecting base 108 as a platform for driving the light stake 100 into the ground 120. For example, the connecting base 108 can be pushed into the ground by a user (e.g., using a hand or a foot) or can be struck with a hammer.

Figure 10:
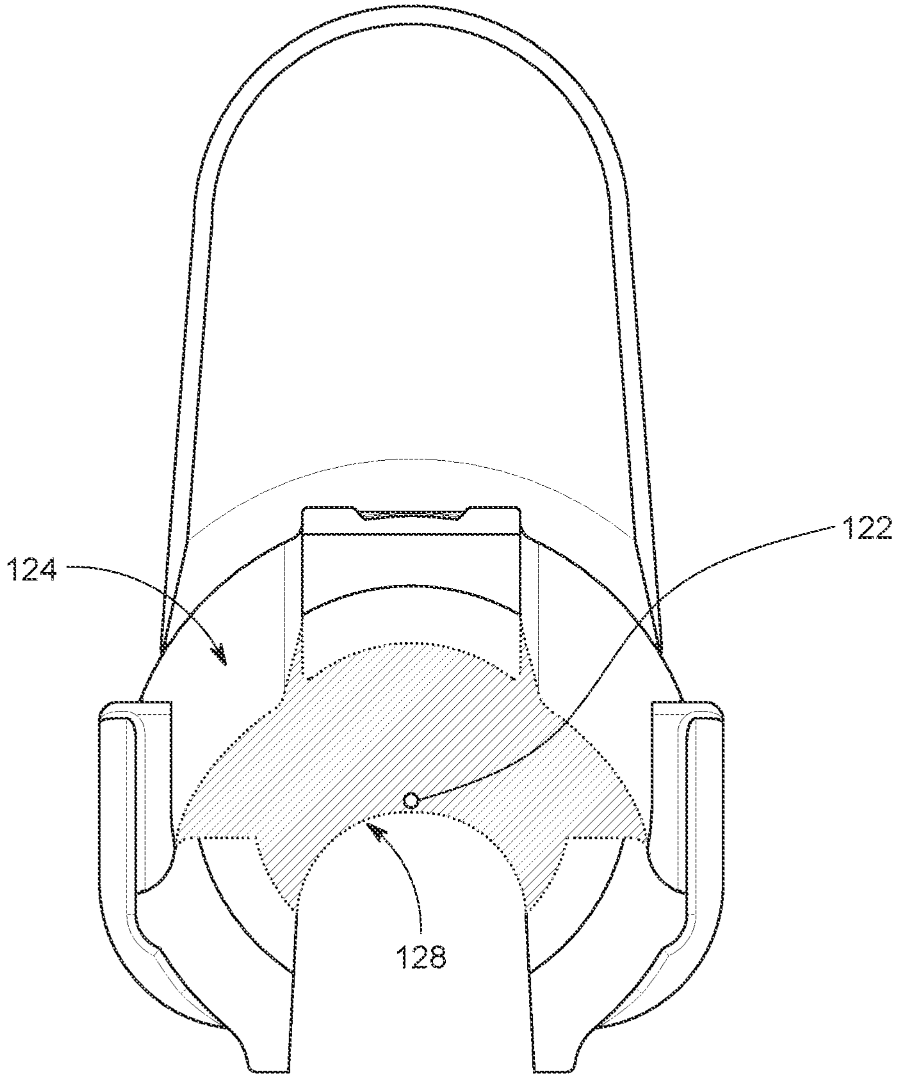
FIG. 10 is a top side view of the light stake of FIG. 1, illustrating a solid-material periphery in accordance with another exemplary embodiment.

Referring to FIG. 10, the socket base 124 has a solid-material periphery 128 generally illustrated in the form of the shown dot-dot line (as viewed from the top). The solid-material periphery 128 extends on all sides of the socket axis 122 to increase base strength in supporting insertion or removal of the light bulb 102 (shown in FIG. 1). In other words, the socket axis 122 pass through solid material of the socket base 124, as defined by the solid-material periphery 128.

Figure 11:
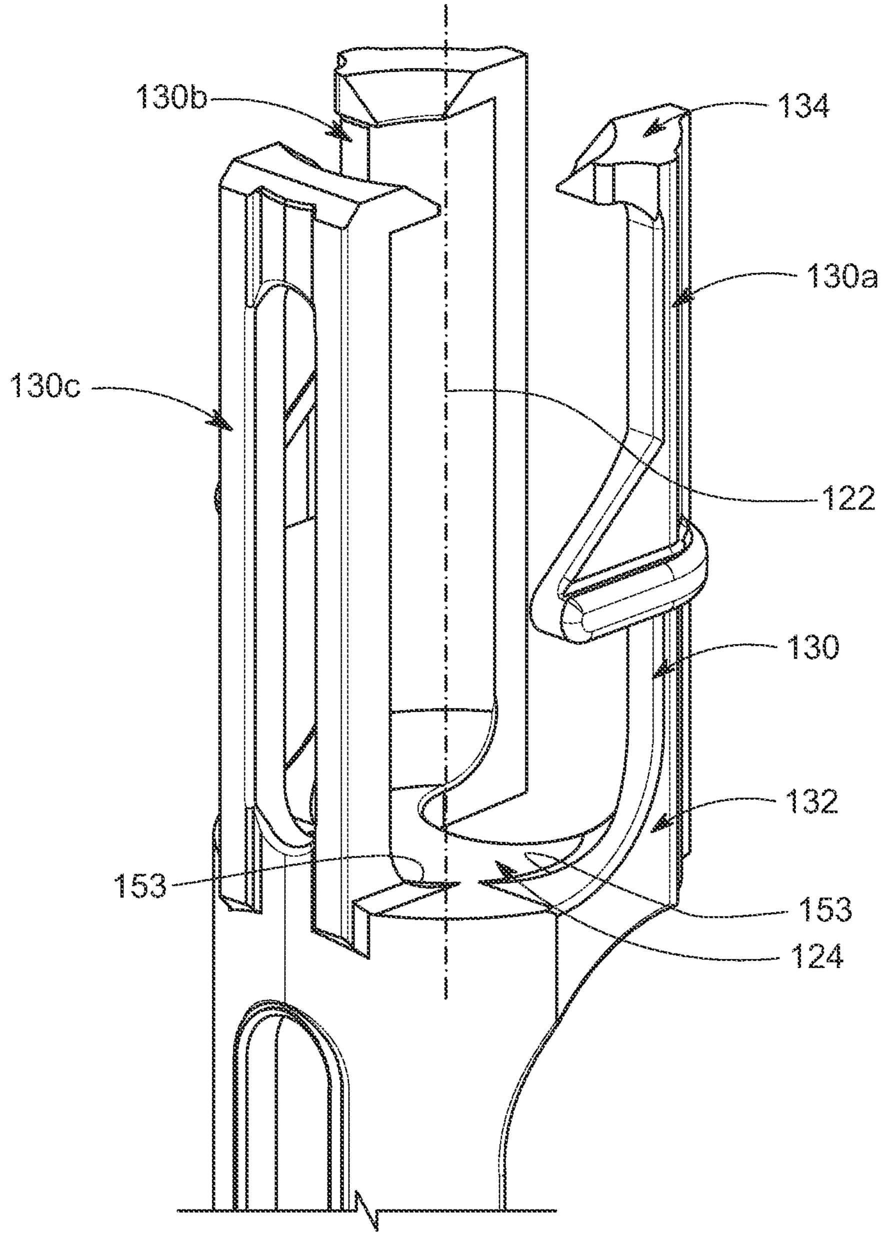
FIG. 11 is a partial front perspective view of the light stake of FIG. 1, illustrating a plurality of fingers in accordance with another exemplary embodiment.

Referring to FIG. 11, a plurality of fingers 130 extend from the socket base 124 along the socket axis 122. In this example, the plurality of fingers includes a first finger 130*a*, a second finger 130*b*, and a third finger 130*c*. Each finger 130 extends between a fixed end 132, near the socket base 124, and a movable end 134. At the intersection between the fixed end 132 and the socket base 124 is a strengthening fillet 153 to increase the local thickness of each fixed end 132 and of the socket base 124 for increased rigidity of the fixed end 132. The movable end 134 of each finger 130 is independently flexible from the other two movable ends 134 to facilitate insertion or removal of the light bulb 102 (shown in FIG. 1) in the socket 110.

Figure 12:
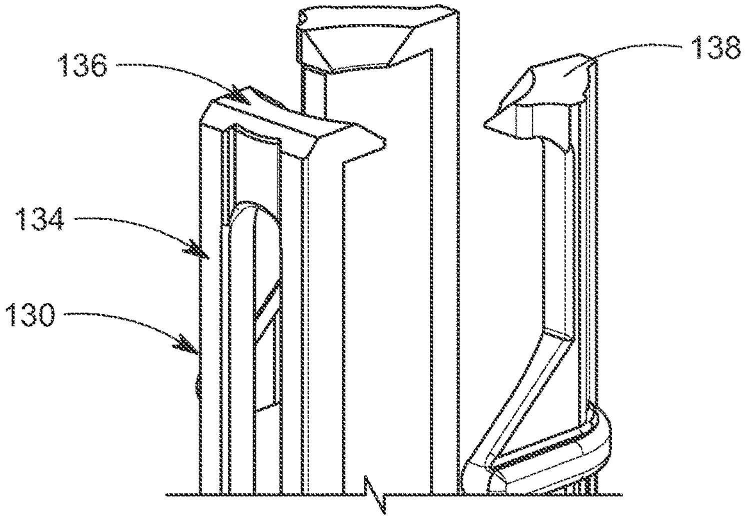
FIG. 12 is a partial front perspective view of the fingers of FIG. 11, illustrating movable ends of the fingers in accordance with another exemplary embodiment.
Figure 13:
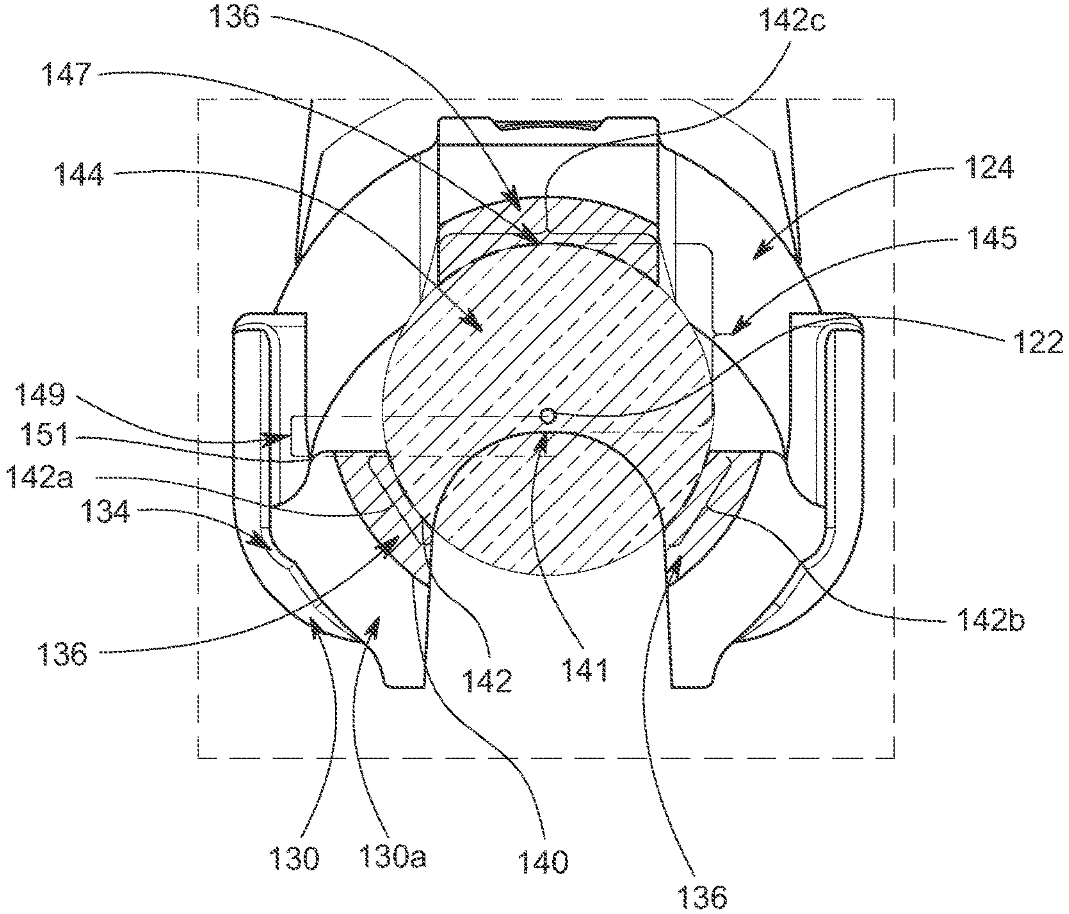
FIG. 13 is a partial top side view of the light stake of FIG. 1, illustrating retaining tabs in accordance with another exemplary embodiment.

Referring generally to FIGS. 12 and 13, the movable end 134 of each finger 130 forms a retaining tab 136. Referring more specifically in FIG. 13, each retaining tab 136 has a top surface 138 that is defined in part by an external arc 140 and an internal arc 142. Each internal arc 142 is coincident with and covers a portion of an internal circumference 144. In other words, a first internal arc 142*a*, a second internal arc 142*b*, and a third internal arc 142*c* cover a portion of the internal circumference 144. The total sum of the internal arcs 142*a*-142*c* covers at least 32 percent of the internal circumference 144.

According to one example, the internal circumference 144 is 1.73 inches and total sum of the internal arcs 142*a*-142*c* is 0.73 inches. According to another example, the first internal arc 142*a* is 0.16 inches, the second internal arc 142*b* is 0.16 inches, and the third internal arc 142*c* is 0.41 inches. According to yet another example, the first and second internal arcs 142*a*, 142*b* are equal to or greater than 0.07 inches. The magnitude of the internal arcs 142*a*-142*c* help provide sufficient strength and rigidity to the socket base 124, while simultaneously retaining flexibility for the movable ends 134.

According to yet another example, an internal distance 145 between (a) a peripheral point 147 on the internal circumference 144 and (b) an internal base point 141 that extends passed the socket axis 122 is at least 0.12 inches to provide sufficient strength and rigidity to the socket base 124, while simultaneously retaining flexibility for the movable ends 134. In a more specific example, the internal distance 145 is 0.29 inches.

According to one example, a strengthening distance 149 between (a) the socket axis 122 and (b) an inner edge 151 of the first finger 130*a* is equal to or less than 0.15 inches. According a specific example, the strengthening distance 149 is 0.06 inches. The strengthening distance 149 also help provide sufficient strength and rigidity to the socket base 124, while simultaneously retaining flexibility for the movable ends 134.

Figure 16:
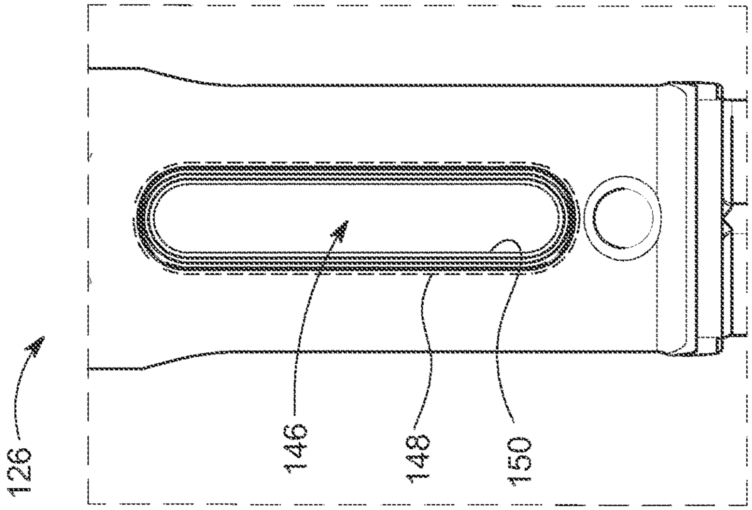
FIG. 16 is a partial front side view of FIG. 14, further illustrating the strengthening border.
Figure 15:
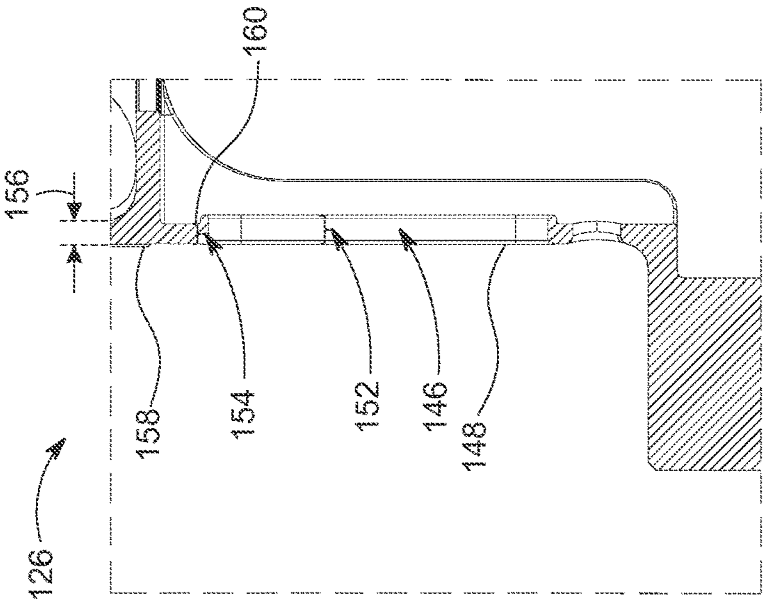
FIG. 15 is a partial cross-sectional view along lines "15"-"15" of FIG. 14, illustrating a strengthening border in accordance with another exemplary embodiment.
Figure 14:
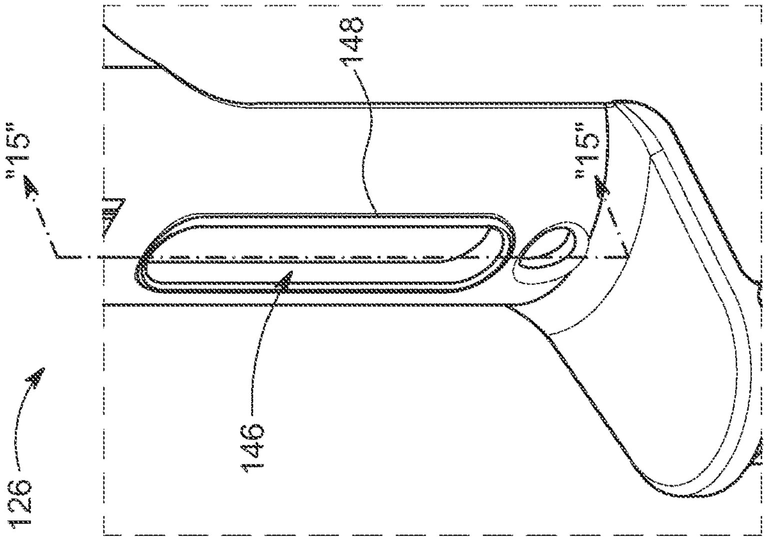
FIG. 14 is a partial front perspective view of the light stake of FIG. 1, illustrating a riser in accordance with another exemplary embodiment.

Referring generally to FIGS. 14-16, the riser 126 has an internal slot 146 (best illustrated in FIGS. 14 and 16) with a strengthening border 148 that surrounds all-around a slot periphery 150 (illustrated in FIG. 16). For further clarity, in FIG. 16, the strengthening border 148 is illustrated in the form of a dash-dash line, and the slot periphery 150 is illustrated in the form of a dot-dot line. Referring specifically to FIG. 15, the strengthening border 148 has a border thickness 152 that is greater than a riser thickness 154. The riser thickness 154 is generally defined by a distance 156 between an external surface 158 and an internal surface 160 of the riser 126.

Figure 17:
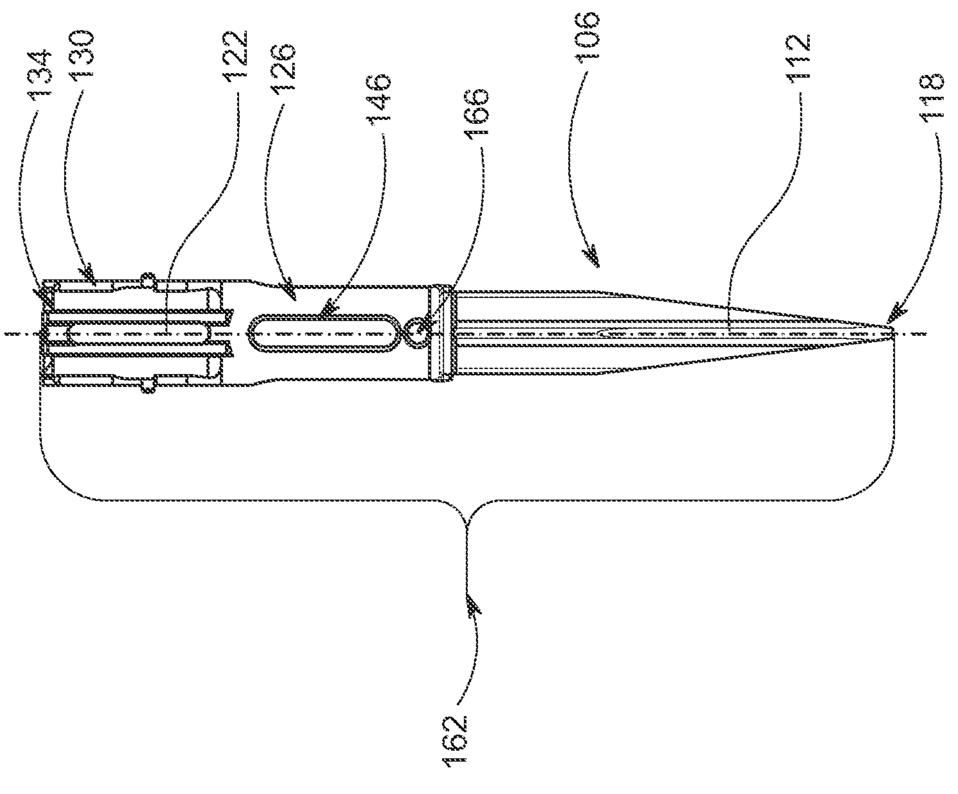
FIG. 17 is a front side view of the light stake of FIG. 1, illustrating an internal slot in accordance with another exemplary embodiment.

Referring to FIG. 17, according to an exemplary embodiment, an axial length 162 between the insertion end 118 of the spike 106 and the movable end 134 of any of the three fingers 130 is approximately 7.5 inches. The riser 126 has a single internal slot 146, which is generally symmetrically positioned relative to both the spike axis 112 and the socket axis 122. A through-hole 166 is positioned below the internal slot 146 for additional mounting capabilities.

Figure 18:
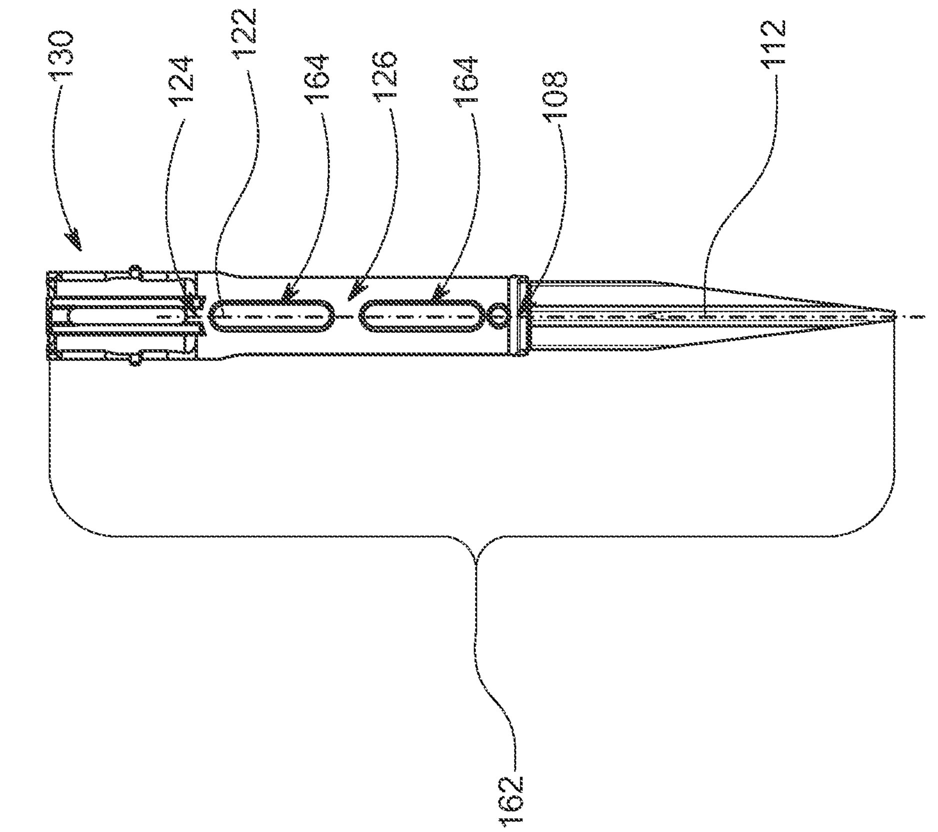
FIG. 18 is a front side view of another light stake, illustrating two internal slots in accordance with another exemplary embodiment.

Referring to FIG. 18, according to another exemplary embodiment, the axial length 162 is approximately 11 inches. In this embodiment, the riser 126 has two internal slots 164, which are symmetrically positioned relative to the spike and socket axes 112, 122. The internal slots 164 are further generally symmetrically positioned between the connecting base 108 and the socket base 124.

Figure 19:
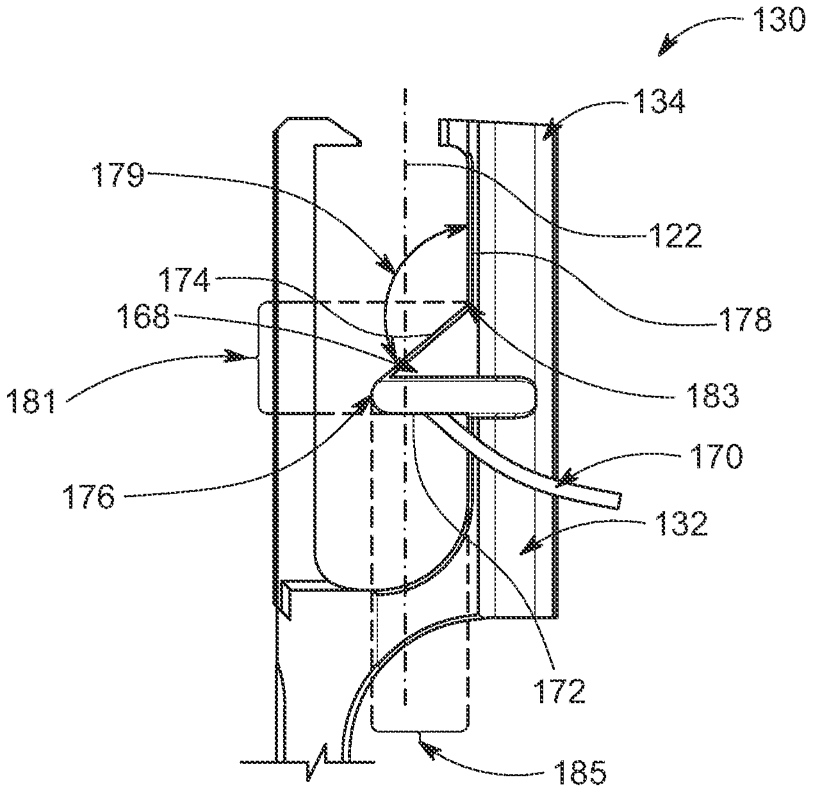
FIG. 19 is a partial right side view of another light stake, illustrating a wire catch in accordance with another exemplary embodiment.

Referring to FIG. 19, according to an alternative embodiment, at least one of the fingers 130 includes a wire catch 168 for routing a wire 170 to which the light bulb 102 (illustrated in FIG. 1) is connected. Specifically, the wire catch 168 extends from the respective finger 130 towards the socket axis 122 in a generally perpendicular direction from the finger 130. The wire catch 168 is positioned between the fixed end 132 and the movable end 134 of the finger 130. The wire catch 168, according to this example, has a flat bottom surface 172 that makes contact with the wire 170 to catch and retain in place the wire 170. The wire catch 168 further has an upper surface 174 that is diagonally oriented from an internal end 176 of the bottom surface 172 and an inner surface 178 of the finger 130. The diagonal orientation provide rigidity to the wire catch 168, while maintaining a low space profile.

According to one example, an angle 179 between the upper surface 174 and the inner surface 178 is approximately 132 degrees. According to another example, a vertical distance 181 between (a) a top end 183 of the wire catch 168 and (b) the internal end 176 is 0.38 inches. According to yet another example, a horizontal distance 185 between (a) the inner surface 178 and (b) the internal end 176 is 0.30 inches. These exemplary dimensions help achieve the rigidity of the wire catch 168, while maintaining a low space profile.

Figure 20:
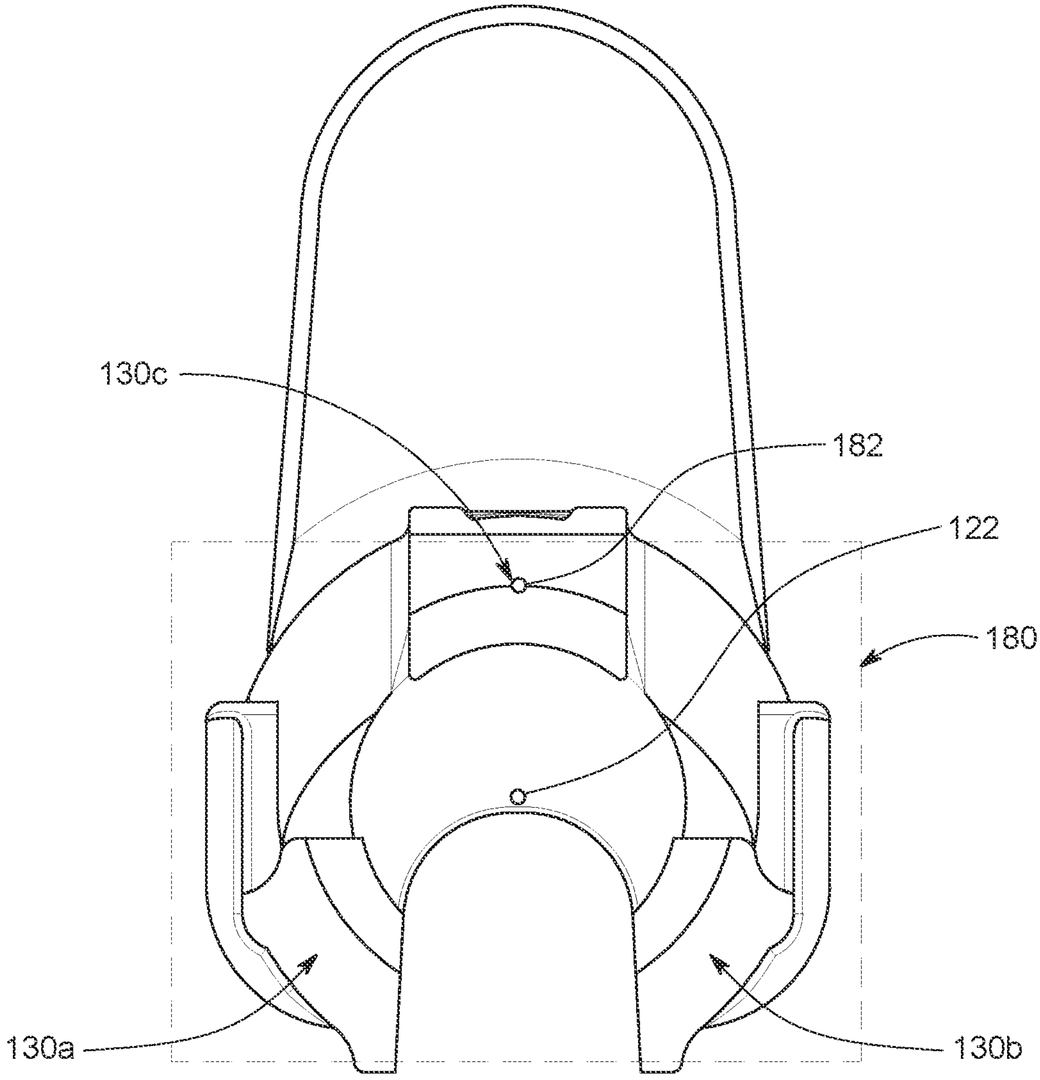
FIG. 20 is a top side view of the light stake of FIG. 1, illustrating a finger configuration in accordance with another exemplary embodiment.

Referring to FIG. 20, according to another alternative embodiment, the first finger 130*a* and the second finger 130*b* are symmetrically positioned relative to the socket axis 122 along a plane 180 that is perpendicular to the socket axis 122 (as viewed in the illustrated plane). The third finger 130*c* has a midpoint 182 that is aligned with the socket axis 122 along the plane 180. This configuration provides enhanced rigidity, while simultaneously allowing insertion and/or removal of the light bulb 102 (illustrated in FIG. 1).

Figure 22:
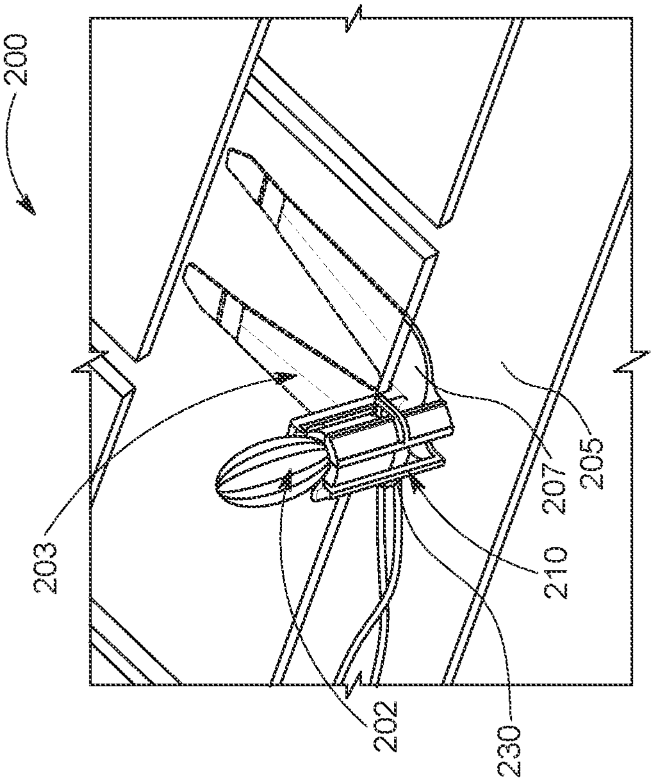
FIG. 22 shows the shingle clip device of FIG. 21 installed under a shingle of a roof.
Figure 21:
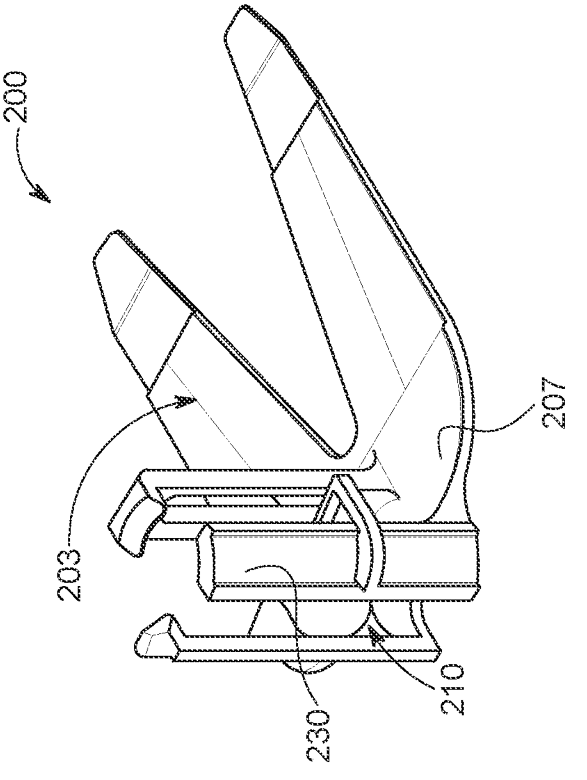
FIG. 21 is a perspective view of a shingle clip device according to another aspect of the present disclosure having a V-shaped clip configured to be inserted underneath a shingle or tile of a roof.

Referring to FIGS. 21 and 22, a shingle clip device 200, according to another aspect of the present disclosure, has a V-shaped clip 203 configured for insertion underneath of a shingle or tile 205 (shown only in FIG. 22) of a roof. Unlike the light stake 100 shown and described above, the shingle clip device 200 lacks a spike or riser, but instead has the V-shaped clip 203 extending away from an upper surface 207 of the clip device 200. The clip device 200 includes a socket 210 and a plurality of fingers 230, just like the socket 110 and fingers 130 described above in connection with the clip device 100. A light bulb 202 (shown only in FIG. 22) is held between the fingers 230 of the clip device 200, just like in the light stake 100 disclosed above. According to some examples, the light bulb 202 is a C7 or C9 light bulb that can be installed on 10" or 12" shingles.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A light stake for holding a light bulb, the light stake comprising:

a spike having a body extending along a spike axis between a top end and an insertion end;

a connecting base at the top end of the body; and a socket having a socket axis and including a socket base extending generally perpendicular to the socket axis and having a solid-material periphery, the solid-material periphery extending on all sides of the socket axis for increased base strength in supporting insertion or removal of the light bulb, a plurality of spaced fingers extending from the socket base along the socket axis, each finger of the plurality of fingers extending between a fixed end near the socket base and a movable end, and a strengthening fillet at the intersection between an interior surface of the fixed end of each finger and the socket base, at least a portion of the strengthening fillet extending towards the socket axis and increasing a thickness of each fixed end and of the socket base for increased rigidity of the fixed end.

2. The light stake of claim 1, wherein the connecting base extends generally perpendicular to the spike axis.

3. The light stake of claim 1, wherein the socket axis is generally parallel to and offset from the spike axis.

4. The light stake of claim 1, wherein the plurality of fingers includes three fingers, the movable end of each finger being independently flexible from the other two movable ends to facilitate insertion or removal of a light bulb in the socket.

5. The light stake of claim 1, further comprising a riser extending between the connecting base and the socket base along and offset from the socket axis.

6. The light stake of claim 5, wherein the riser has an internal slot with a strengthening border all-around a slot periphery.

7. The light stake of claim 6, wherein the strengthening border has a border thickness that is greater than a riser thickness, the riser thickness being a distance between an external surface and an internal surface of the riser.

8. The light stake of claim 7, wherein the internal slot is a single slot.

9. The light stake of claim 7, wherein the riser includes a second internal slot.

10. The light stake of claim 1, wherein the movable end of each finger forms a retaining tab having a top surface defined in part by an external arc and an internal arc, each internal arc being coincident with and covering a portion of an internal circumference, a total sum of the internal arc of the three fingers covering at least 32 percent of the internal circumference.

11. The light stake of claim 10, wherein the diameter of the internal circumference is approximately 1.73 inches and the total sum is approximately 0.73 inches.

12. The light stake of claim 1, further comprising a wire catch extending from at least one finger of the plurality of fingers towards the socket axis, the wire catch being generally perpendicular to the socket axis, the wire catch being positioned between the fixed end and the movable end of the at least one finger.

13. The light stake of claim 1, wherein the plurality of fingers include a first finger, a second finger, and a third finger, the first finger and the second finger being symmetrically positioned relative to the socket axis along a plane perpendicular to the socket axis, the third finger having a midpoint that is aligned with the socket axis along the plane.

14. The light stake of claim 1, wherein the insertion end of the spike is narrower than the top end for facilitating driving the spike through a ground surface.

15. A light stake for holding a light bulb, the light stake comprising:

a spike having a body extending along a spike axis between a top end and an insertion end;

a connecting base extending generally perpendicular to the spike axis; and a socket having a socket axis that is generally parallel to and offset from the spike axis, the socket including a socket base extending generally perpendicular to the socket axis and having a solid-material periphery, the solid-material periphery extending on all sides of the socket axis for increased base strength in supporting insertion or removal of the light bulb, three spaced fingers extending from the socket base along the socket axis, each finger of the three fingers extending between a fixed end near the socket base and a movable end, the movable end of each finger being independently flexible from the other two movable ends to facilitate insertion or removal of a light bulb in the socket, a riser extending between the connecting base and the socket base along and offset from the socket axis, and a strengthening fillet at the intersection between an interior surface of the fixed end of each finger and the socket base, at least a portion of the strengthening fillet extending towards the socket axis and increasing a thickness of each fixed end and of the socket base for increased rigidity of the fixed end.

16. The light stake of claim 15, wherein the movable end of each finger forms a retaining tab having a top surface defined in part by an external arc and an internal arc, each internal arc being coincident with and covering a portion of an internal circumference, a total sum of the internal arc of the three fingers covering at least 32 percent of the internal circumference.

17. The light stake of claim 15, wherein the riser has an internal slot with a strengthening border all-around a slot periphery, the strengthening border having a border thickness that is greater than a riser thickness, the riser thickness being a distance between an external surface and an internal surface of the riser.

18. The light stake of claim 15, wherein an axial length between the insertion end of the spike and the movable end of any of the three fingers is approximately 7.5 inches, the riser having a single internal slot.

19. The light stake of claim 15, wherein an axial length between the insertion end of the spike and the movable end of any of the three fingers is approximately 11 inches, the riser having two internal slots.

20. The light stake of claim 1, further comprising a wire catch extending from at least one finger of the three fingers towards the socket axis, the wire catch being generally perpendicular to the socket axis, the wire catch being positioned between the fixed end and the movable end of the at least one finger.

* * * * *